(12) United States Patent
Anderson et al.

(10) Patent No.: US 10,488,508 B2
(45) Date of Patent: Nov. 26, 2019

(54) MEASURING AN AREA OF INTEREST BASED ON A SENSOR TASK

(71) Applicants: Utah State University Research Foundation, Logan, UT (US); The Government of the United States of America, as represented by the Secretary of the Navy

(72) Inventors: Scott Allen Anderson, Logan, UT (US); Troy R. Johnson, North Logan, UT (US); Jonathan R. Haws, Richmond, UT (US); Brad D. Petersen, Smithfield, UT (US); Thomas J. Walls, Springfield, VA (US)

( * ) Notice: Subject to any disclaimer, the term of this patent is extended or adjusted under 35 U.S.C. 154(b) by 0 days.

(21) Appl. No.: 16/039,574

(22) Filed: Jul. 19, 2018

(65) Prior Publication Data

US 2018/0348358 A1 Dec. 6, 2018

Related U.S. Application Data

(63) Continuation-in-part of application No. 15/290,725, filed on Oct. 11, 2016, now abandoned.

(51) Int. Cl.
| | |
|---|---|
| *G01S 13/72* | (2006.01) |
| *G01S 13/88* | (2006.01) |
| *G01S 13/90* | (2006.01) |
| *G01S 13/82* | (2006.01) |
| *G01S 7/00* | (2006.01) |
| *G01S 13/87* | (2006.01) |

(52) U.S. Cl.
CPC ............ *G01S 13/726* (2013.01); *G01S 7/003* (2013.01); *G01S 13/82* (2013.01); *G01S 13/87* (2013.01); *G01S 13/883* (2013.01); *G01S 13/9029* (2013.01)

(58) Field of Classification Search
CPC .............................. G01B 21/04; G05B 19/401
See application file for complete search history.

(56) References Cited

U.S. PATENT DOCUMENTS

| | | |
|---|---|---|
| 2009/0062936 A1 | 3/2009 | Nguyen et al. |
| 2017/0131716 A1 | 5/2017 | Brekke et al. |

OTHER PUBLICATIONS

Masahiko Nagai, Apichon Witayangkurn, Kiyoshi Honda, and Ryosuke Shibasaki, "UAV-Based Sensor Web Monitoring System," International Journal of Navigation and Observation, vol. 2012, Article ID 858792 (Year: 2012).*

Dale Linne Von Berg et al., "Multisensor airborne imagery collection and processing onboard small unmanned systems", Apr. 24, 2010, pp. 1-28.

Thomas J. Walls et al., "Scalable sensor management for automated fusion and tactical reconnaissance", Nov. 2, 2017, pp. 1-19.

* cited by examiner

*Primary Examiner* — Ajay Ojha

(57) ABSTRACT

For measuring an area of interest based on a sensor task, a method generates a sensor task comprising a sensor type and an area of interest. The method further routes the sensor task to a sensor of the sensor type and with a sensor motion track that includes the area of interest. The method measures the area of interest with the sensor based on the sensor task.

20 Claims, 25 Drawing Sheets

220

| Data Index 222 |
| Measurement Coordinates 224 |
| Measurement Error 226 |
| Sensor Measurement 228 |
| Sensor Position 230 |
| Measurement Distance 232 |
| Sensor Type 234 |
| Time Stamp 238 |
| Node Identifier 206 |
| Detection 356 |

170

| Target Identifier 242 |
| --- |
| Target Geometry 244 |
| Target Location 246 |
| Target Type 248 |
| Target Characteristics 250 |

140

| Sensor Task Identifier 260 |
| --- |
| Node Identifier 206 |
| Sensor Identifier 272 |
| Sensor Type 234 |
| Area of Interest 262 |
| Time of Interest 274 |
| Sensor Motion Track 264 |
| Voice Command 266 |
| Text Command 268 |
| Sensor Command 270 |

280

| Link Identifier
282 |
|---|
| Link Description
284 |
| Loss Level
286 |
| Link Type
288 |
| Link Data Rate
290 |
| Link Priority
292 |

192

| Path Identifier 306 |
|---|
| Path Description 308 |
| Path Loss Level 316 |
| Path Type 310 |
| Path Data Rate 312 |
| Path Priority 314 |
| Link Identifier 282a |
| Link Identifier 282a |

470

| Temporal/Spatial Vector |
| 471 |

| Temporal/Spatial Vector |
| 471 |

| Temporal/Spatial Vector |
| 471 |

⋮

| Temporal/Spatial Vector |
| 471 |
| Target Model |
| 473 |
| Confidence Level |
| 475 |
| Search Time |
| 477 |

MEASURING AN AREA OF INTEREST BASED ON A SENSOR TASK

This is a continuation-in-part application of and claims priority to U.S. patent application Ser. No. 15/290,725 entitled "MEASURING AN AREA OF INTEREST BASED ON A SENSOR TASK" and filed on Oct. 11, 2016 for Scott Allen Anderson, which is incorporated herein by reference.

GOVERNMENT RIGHTS

This invention was made with government support. The government has certain rights in the invention.

FIELD

The subject matter disclosed herein relates to a sensor task and more particularly relates to measuring an area of interest based on a sensor task.

BACKGROUND

Description of the Related Art

Information management systems in the field must often identify areas of interest and gather information for the area of interest in real time.

BRIEF SUMMARY

A method for measuring an area of interest based on a sensor task is disclosed. The method generates a sensor task comprising a sensor type and an area of interest. The method further routes the sensor task to a sensor of the sensor type and with a sensor motion track that comprises the area of interest. The method measures the area of interest with the sensor based on the sensor task. An apparatus and system also perform the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 6C is a schematic block diagram illustrating one embodiment of a dynamic target area;

DETAILED DESCRIPTION

Figure 1A:
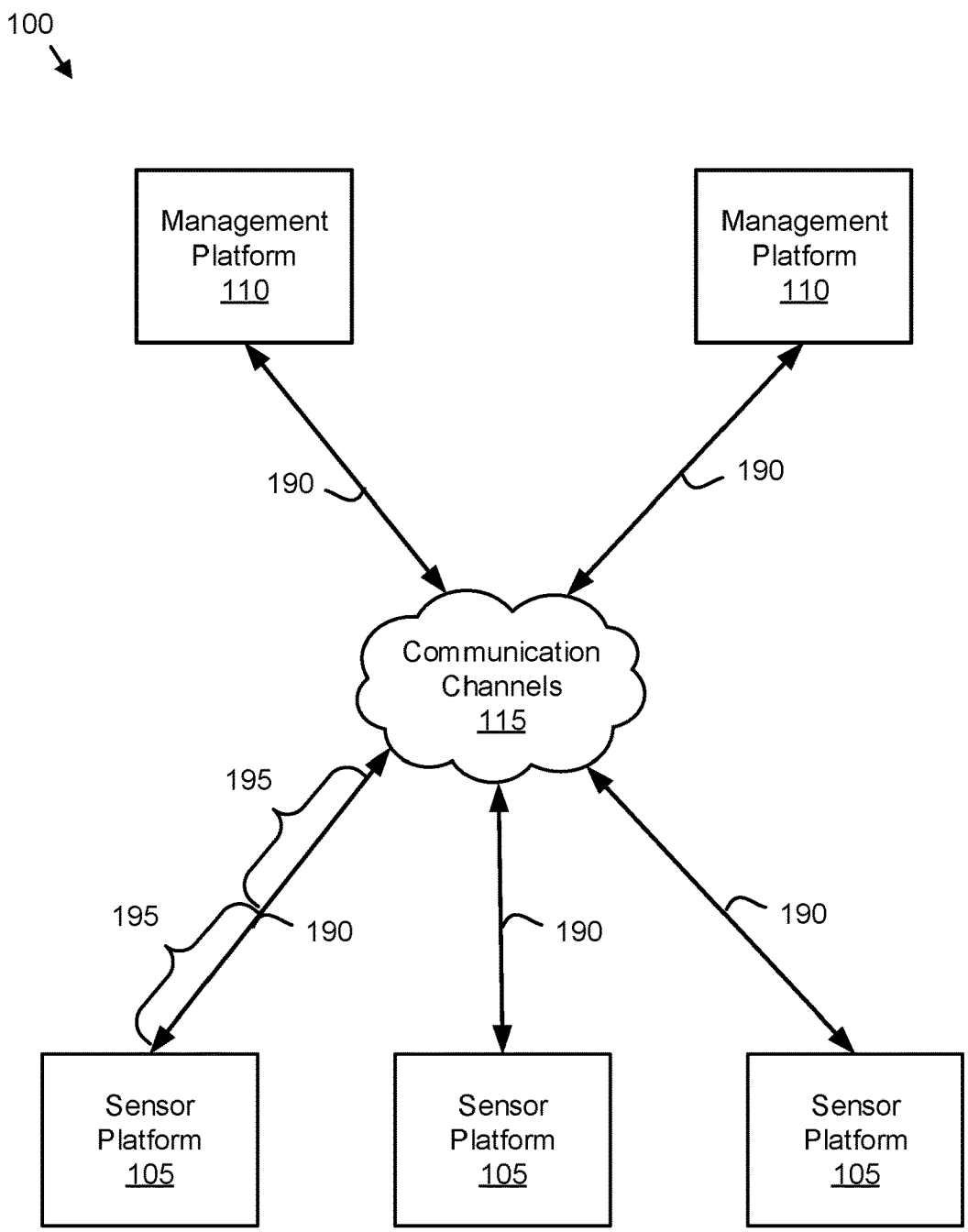
FIG. 1A is a schematic block diagram illustrating one embodiment of a sensor management system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory and/or processing devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Python, Ruby, Java, Smalltalk, C++ or the like and conventional procedural programming languages, such as the "C" programming language or similar programming languages, and hardware definition languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a schematic block diagram illustrating one embodiment of a sensor management system 100. In the depicted embodiment, the system 100 includes one or more management platforms 110, one or more sensor platforms 105, and one or more communication channels 115. The management platforms 110 and the sensor platforms 105 may communicate over paths 190 through the communication channels 115.

A sensor platform 105 may be disposed on an aircraft, a drone, a vehicle, a satellite, a ground station, or the like. The sensor platform 105 may include one or more sensors as will be described hereafter. The sensors may record sensor data on a physical space. In one embodiment, the physical space is a battlefield. Alternatively, the physical space may be a survey area. The sensor data may be for intelligence, surveillance, and/or reconnaissance use. In addition, the sensor data may be used to identify targets.

A management platform 110 and/or a sensor platform 105 may process the sensor data to generate reconnaissance, surveillance, intelligence, and/or tactical information. In addition, decisions may be made based on the processed sensor data.

Combinations of management platforms 110 and sensor platforms 105 may communicate over paths 190 through the communication channels 115. Each path 190 may include one or more links 195. The communication channels 110 may include wireless communication channels, fiber-optic communication channels, laser-based communication channels, and the like.

In the past, sensor platforms 105 gathered sensor data that was transmitted to a dedicated management platform 110. The management platform 110 analyzed the sensor data. If the analysis identified an area of the physical space that warranted further investigation, manual instructions were generated for pilots and/or observers to gather additional data. Unfortunately, the delays introduced by the manual identification of errors and issuance of instructions often meant that a sensor platform 105 was no longer in the area to gather the additional data. In addition, important sensor data and resulting data products was only slowly disseminated through various management systems to users.

The embodiments described herein control sensor data collection by a wide variety of disparate sensors on the sensor platforms 105. The embodiments of the system 100 employ a plurality of computers and agents executing on the computers to generate sensor tasks and route the sensor tasks to appropriate sensors. As a result, the system 100 may more rapidly direct sensors to measure an area of interest, improving the value of the aggregate sensor data gathered.

In addition, the sensor management system 100 may support dynamically changing allocations of sensor platforms 105, communication channels 115, and management platforms 110. As a result, the system 100 may seamlessly manage sensor data collection and analysis for the physical space.

Figure 1B:
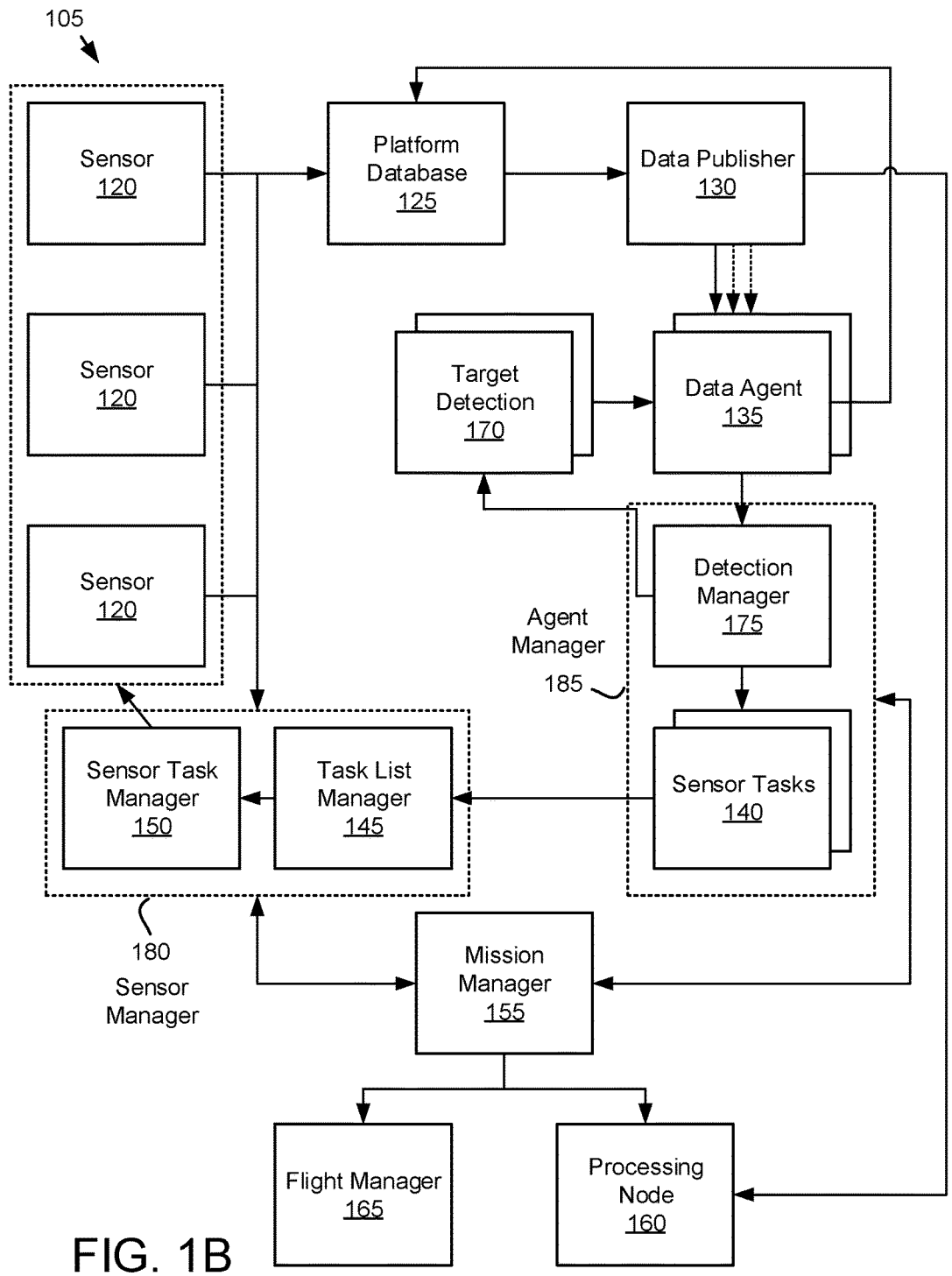
FIG. 1B is a schematic block diagram illustrating one embodiment of a sensor platform.

FIG. 1B is a schematic block diagram illustrating one embodiment of a sensor platform 105. In the depicted embodiment, the sensor platform 105 includes one or more sensors 120, a platform database 125, a data publisher 130, one or more data agents 135, an agent manager 185, one or more target detections 170, a sensor manager 180, a mission manager 155, a flight manager 165, and a processing node 160. The agent manager 185 may include a detection manager 175 and one or more sensor tasks 140. The sensor manager 180 may include a task list manager 145 and a sensor task manager 150. The sensors 120, platform database 125, data publisher 130, data agents 135, agent manager 185, detection manager 175, sensor tasks 140, target detections 170, sensor manager 180, task list manager 145, sensor task manager 150, mission manager 155, and flight manager 165 may each be organized as one or more data structures and/or routines of code stored in one or more memories and executed by one or more processors of one or more processing nodes 160.

The sensors 120 may include radar sensors, optical sensors, lidar sensors, thermal imaging sensors, and the like. In response to a sensor task, a sensor 120 may collect sensor data and store the sensor data in the platform database 125 as platform data. The data publisher 130 may establish a publish/subscribe relationship with the platform data in the platform database 125. In one embodiment, the data publisher 130 may establish the publish/subscribe relationship in response to a request from a data agent 135.

In one embodiment, the sensors 120 communicate with the sensor platform 105 through one or more standardized physical and software sockets. The sensors 120 may communicate with the sensor platform 105 through one or more standardized physical and software sockets, such as the iSCSI interface specified by the NATO Advanced Digital Storage Interface (NADSI) standard as described by STANAG 4575.

The detection manager 175 may request the publish/subscribe relationship. Alternatively, the agent 135 may request the publish/subscribe relationship in response to a target detection 170. The agent manager 185 may manage the routing of platform data to the data agents 135. In addition, the agent manager 185 may manage the generation of sensor tasks 140.

A data agent 135 may be an interactive software application that is used by a user to view data and/or send commands to the system 100. Alternatively, the data agent 135 may run autonomously and request platform data 220, process platform data 220, and autonomously generate sensor tasks 140. The data agent 135 may receive published platform data from the publish/subscribe relationship. In response to the target detection 170 and platform data, the data agent 135 may correlate the target detection 170 to the platform data. The data agent 135 may further determine an area of interest.

The data agent 135 may communicate the area of interest to the detection manager 175. The detection manager 175 may determine if the area of interest warrants the generation of a sensor task 140. The detection manager 175 may employ one or more algorithms for determining if an area of interest identified by a data agent 135 should be the objective of a sensor task 140.

If the detection manager determines that the area of interest should be the object of a sensor task 140, the detection manager 175 may determine if a sensor 120 of a specified sensor type is available for the area of interest. The detection manager 175 may direct the data agent 135 to generate a sensor task 140 as a function of the area of interest and sensor availability of the sensor 120. Alternatively, a data agent 135 may autonomously generate the sensor task 140.

The sensor task 140 may be received by the task list manager 145. The task list manager 145 may schedule a sensor 120 to measure the area of interest. The sensor 120 may be on another sensor platform 105. A sensor task manager 150 may direct the sensor 120 to measure the area of interest. The sensor data from the area of interest is then added to the platform database 125.

The mission manager 155 may communicate one or more algorithms and/or priorities to the agent manager 185 and the sensor manager 180. The algorithms and priorities may be used by the agent manager 185 and the sensor manager 180 to select sensor tasks 140 for areas of interest and to schedule the sensor tasks 140 on a sensor 120. The sensor task manager 150 may schedule the sensor task 140 on a sensor 120 of the sensor platform 105. In addition, the sensor tasks 140 may be scheduled by the sensor task manager 150 through the mission manager 155 on sensors 120 of another sensor platform 105.

In one embodiment, the mission manager 155 and/or sensor task manager 150 may modify a sensor motion track for the sensor 120. In addition, the mission manager 155 and/or sensor task manager 150 may modify the motion track for the sensor platform 105. The mission manager 155 may direct the flight manager 165 to modify a motion track of the sensor platform 105 for the sensor 120. For example, the mission manager 155 may direct the flight manager 165 to automatically modify the motion track of a drone sensor platform 105. Alternatively, modifying the sensor motion track may a comprise issuing movement directions to an observer.

Figure 1C:
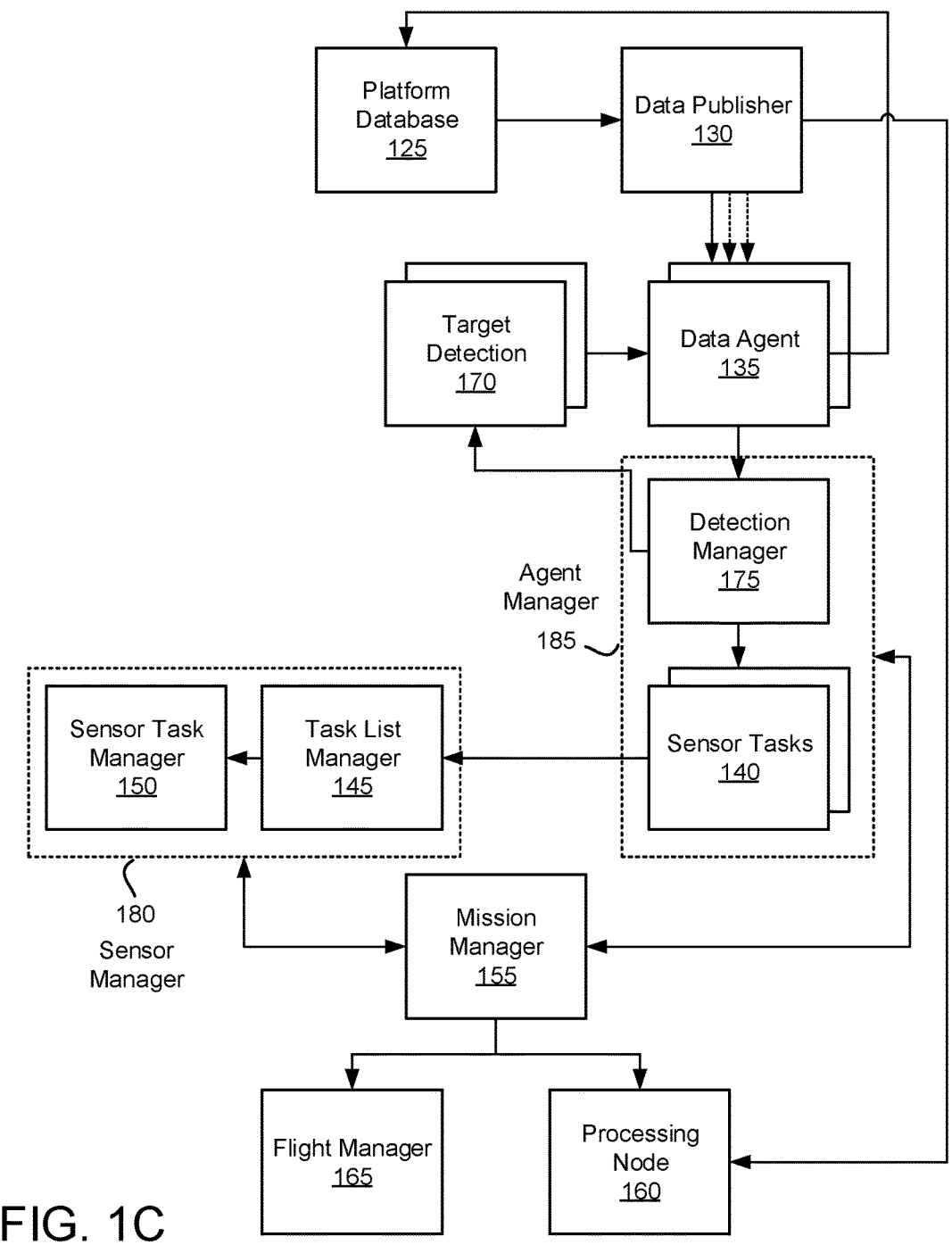
FIG. 1C is a schematic block diagram illustrating one embodiment of a management platform.

FIG. 1C is a schematic block diagram illustrating one embodiment of a management platform 110. In the depicted embodiment, the management platform 110 includes the platform database 125, the data publisher 130, the one or more data agents 135, the agent manager 185, the one or more target detections 170, the sensor manager 180, the mission manager 155, the flight manager 165, and the processing node 160 as described for FIG. 1B. The management platform 110 may generate sensor tasks 140 using platform data transmitted to the platform database 125 from other management platforms 110 and/or sensor platforms 105. The sensor tasks 140 may be scheduled by the sensor task manager 150 through the mission manager 155 on sensors 120 of a sensor platform 105.

Figure 2A:
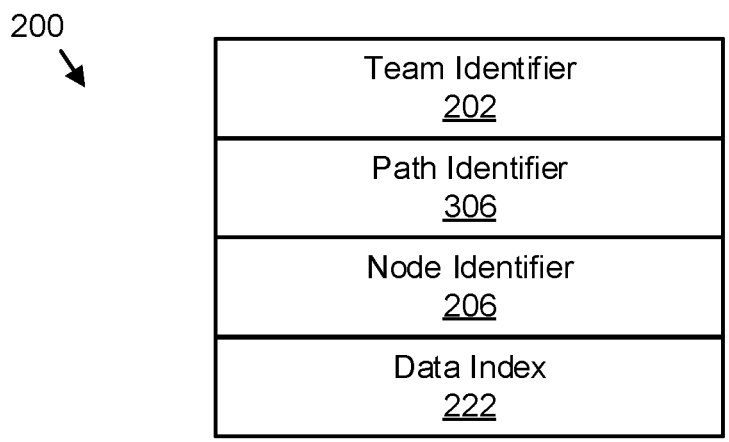
FIG. 2A is a schematic block diagram illustrating one embodiment of team connection.

FIG. 2A is a schematic block diagram illustrating one embodiment of team connection 200. The team connection 200 may be organized as a data structure in a memory. In the depicted embodiment, the team connection 200 includes a team identifier 202, a path identifier 306, a node identifier 206, and a data index 222.

The team identifier 202 may uniquely identify a team connection between one or more management platforms 110 and/or sensor platforms 105. The team connection may be organized to share platform data and/or sensor tasks 140 among the one or more management platforms 110 and sensor platforms 105. The team identifier 202 may be an alphanumeric string.

The path identifier 306 may uniquely describe one or more paths 190 as will be described hereafter in FIG. 3C. The path 190 may be used by the team connection to share platform data and/or sensor tasks 140 among the one or more management platforms 110 and sensor platforms 105.

The node identifier 206 may identify each management platform 110 and/or sensor platform 105 in the team connection. The data index 222 may identify shared platform data for the team connection. In one embodiment, the data index 222 may include pointers to platform data on one or more management platforms 110 and sensor platforms 105.

Figure 2B:
FIG. 2B is a schematic block diagram illustrating one embodiment of platform data.

FIG. 2B is a schematic block diagram illustrating one embodiment of the platform data 220. The platform data 220 may be organized as a data structure in a memory. In the depicted embodiment, the platform data 220 includes a data index 222, measurement coordinates 224, a measurement error 226, a sensor measurement 228, a sensor position 230, a measurement distance 232, a sensor type 234, a timestamp 238, a node identifier 206, and a detection 256.

The data index 222 may identify the platform data 220 within one or more platform databases 125. The measurement coordinates 224 may identify a portion of the physical space for which the sensor measurement 228 was recorded. The measurement error 226 may record an estimated error band for the sensor measurement 228.

The sensor measurement 228 may include a measurement value for the measurement coordinates 224. Alternatively, the sensor measurement 228 may include a measurement matrix for the measurement coordinates 224. The sensor measurement 228 may include radar measurements, lidar measurements, optical measurements, infrared measurements, laser measurements, or combinations thereof.

The sensor position 230 may record a position and orientation of the sensor 120 within the physical space when the sensor measurement 228 was recorded. The measurement distance 232 may record a distance from the sensor position 230 to the measurement coordinates 224.

The sensor type 234 may identify a type of the sensor 120 that recorded the sensor measurement 228. For example, the sensor type 224 may specify one of a radar sensor, a thermal imaging sensor, a lidar sensor, an optical sensor, or the like. In addition, the sensor type 224 may specify one or more of an aperture size for the sensor 120, a sensitivity of the sensor 120, calibration data for the sensor 120, ambient conditions of the sensor 120, and the like.

The timestamp 238 may indicate when the platform data 220 was recorded as sensor data. The node identifier 206 may identify the sensor platform 105 upon which the sensor 120 that recorded the platform data 220 is disposed.

The detection 356 may identify a portion of the sensor measurement that satisfies one or more detection algorithms. For example, a detection 356 may be recorded in response to detecting metal, detecting movement, detecting an electromagnetic signal source, and the like.

Figure 2C:
FIG. 2C is a schematic block diagram illustrating one embodiment of a target detection.

FIG. 2C is a schematic block diagram illustrating one embodiment of a target detection 170. The target detection 170 maybe organized as a data structure in a memory. In the depicted embodiment, the target detection 170 includes a target identifier 242, a target geometry 244, a target location 246, a target type 248, and target characteristics 250.

The target identifier 242 may uniquely identify a target. The target identifier 242 may be an index number. The target geometry 244 may describe physical dimensions of the target. In one embodiment, the target geometry 244 includes a point cloud. In addition, the target geometry 244 may include one or more polygons such as triangles or squares that describe the outer physical dimensions of the target.

The target location 246 may record a location of the target with in the physical space. The target type 248 may record an estimate of a type of the target. For example, the target type 248 may specify that the target is a vehicle. The target characteristics 250 specifies characteristics that are used to identify the target. The target characteristics 250 may also specify a target type.

Figure 2D:
FIG. 2D is a schematic block diagram illustrating one embodiment of sensor task data.

FIG. 2D is a schematic block diagram illustrating one embodiment of sensor task data 140. The sensor task data 140 maybe organized as a data structure in a memory. In the depicted embodiment, the sensor task data includes a sensor task identifier 260, a node identifier 206, a sensor identifier 272, the sensor type 234, the area of interest 262, a time of interest 274, a sensor motion track 264, a voice command 266, a text command 268, and sensor commands 270.

The sensor task identifier 260 uniquely identifies the sensor task 140. The sensor task identifier 260 may be an index number. The node identifier 206 may specify one or more sensor platforms 105 that may be used for a measurement by a sensor 120. In one embodiment, the node identifier 206 is a null value. The null value may indicate that any sensor platform 105 with the sensor 120 of the sensor type 234 may be used for the measurement.

The sensor identifier 272 may specify a sensor 120 that is to record a measurement. In one embodiment, the sensor identifier 272 specifies a set of sensors 120 that is acceptable for recording the measurement. The sensor identifier 272 may be a null value. The null value may indicate that any sensor 120 of the sensor type 234 may be used for the measurement.

The sensor type 234 may identify a type of the sensor 120 that should be used for the sensor measurement 228. For example, the sensor type 224 may specify one of a radar sensor, a thermal imaging sensor, a lidar sensor, an optical sensor, or the like.

The area of interest 262 specifies the area of interest for the measurement by the sensor 120. The area of interest 262 may be organized as spatial coordinates, spatial coordinates and a radius, a specific vector to spatial coordinates, a specified area, a specified volume, a specified object within an area, and the like. In one embodiment, the area of interest 262 includes an azimuth size measured in degrees, a cross-track direction, an elevation size measured in degrees, a flight track direction, an azimuth offset measured in degrees, and an elevation offset measured in degrees. The area of interest 262 may be organized as spatial coordinates. In one embodiment, the area of interest 262 is organized as dynamic temporal/spatial vectors as will be described hereafter. In a certain embodiment, the area of interest 262 specifies where the sensors 120 should take measurements.

The time of interest 274 may specify a time interval for which measurements of the area of interest 262 are desired. In one embodiment, the time of interest 274 specifies multiple time intervals.

The sensor motion track 264 may specify a track that is followed by the sensor platform 105 when acquiring the measurement. The voice command 266 may record a command that is communicated in audible form to an observer. The observer following the command may move the sensor platform 105 along the sensor motion track 264. The text command 268 may record the command to move the sensor platform 105 along the sensor motion track 264. The text command 268 may be communicated to the observer.

The sensor command 270 directs a sensor 120 to capture the desired measurement such as a measurement of the area of interest 262. The sensor command 270 may specify a duration of the measurement, an angle of the measurement, one or more sensor parameters for the sensor 120, and the like.

Figure 2E:
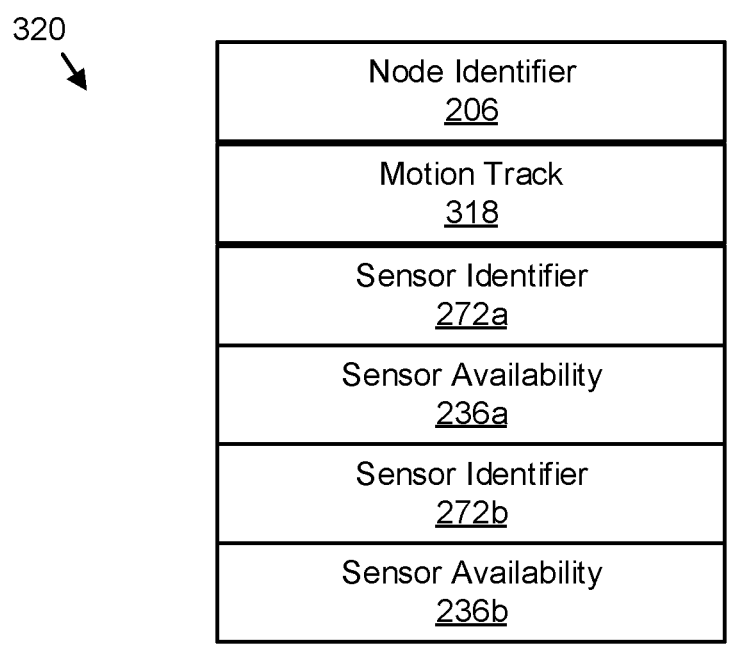
FIG. 2E is a schematic block diagram illustrating one embodiment of sensor platform data.

FIG. 2E is a schematic block diagram illustrating one embodiment of sensor platform data 320. The sensor platform data 320 maybe organized as a data structure in a memory. In the depicted embodiment, the sensor platform data 320 includes a node identifier 206, a motion track 318, and sensor identifiers 272 and sensor availabilities 236 for one or more sensors 120.

The node identifier 206 may uniquely identify a sensor platform 105. The motion track 318 may record a scheduled track for the sensor platform 105. The motion track 318 may include a plurality of points in the physical space. An estimated time that the sensor platform 105 will be at a point may also be associated with each point. Physical and temporal guard bands may be associated with each point. The physical guard band may estimate a three sigma deviation from the motion track point by the sensor platform 105. The temporal guard band may estimate a three sigma deviation from an estimated time that the sensor platform 105 is scheduled to pass through the point.

Each sensor identifier 272 may uniquely identify a sensor 120 on the sensor platform 105. For example, a radar sensor 120 may be assigned the sensor identifier 272 "R124."

The sensor availability 236 may specify one or more time intervals when the corresponding sensor 120 is available for taking measurements. In addition, portions of the physical space that may be accessible by the sensor 120 may also be specified for each time interval. In one embodiment, the portions of the physical space may include coordinates of an area on the ground of the physical space. In addition, the portions of the physical space may specify an altitude range for the sensor platform 105.

Figure 3A:
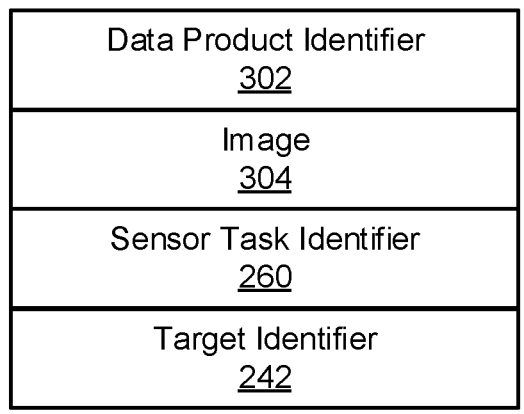
FIG. 3A is a schematic block diagram illustrating one embodiment of a data product.

FIG. 3A is a schematic block diagram illustrating one embodiment of a data product 113. The data product 113 may be organized as a data structure in a memory. In the depicted embodiment, the data product 113 includes a data product identifier 302, an image 304, a sensor task identifier 260, and a target identifier 242.

The data product identifier 302 may uniquely identify the data product 113. The data product identifier 302 may be an index value. The image 304 may comprise one or more of a raw still image of platform data 220, a raw video image of platform data 220, a still image processed from platform data 220, a video image processed from platform data 220, a target identification, and the like. The sensor task identifier 260 may specify one or more sensor tasks 140 that contributed to the generation of the data product 113. The target identifier may specify one or more target detections 170 that contributed to the generation of the data product 113.

Figure 3B:
FIG. 3B is a schematic block diagram illustrating one embodiment of link data.

FIG. 3B is a schematic block diagram illustrating one embodiment of link data 280. The linked data 280 may describe a link 195 of a path 190. The link data 280 maybe organized as a data structure in a memory. In the depicted embodiment, the link data 280 includes a link identifier 282, a link description 284, a loss level 286, a link type 288, a link data rate 290, and a link priority 292.

The link identifier 282 may uniquely identify a link 195. The link identifier 282 may be an index value. The link description 284 may describe the link 195. For example, a link 195 may be described in the link description 284 as an Institute of Electrical and Electronic Engineers (IEEE) 802 compliant link.

The loss level 286 may characterize a loss level for data that is communicated over the link 195. The loss level 286 may characterize an average loss level. Alternatively, the loss level 286 may characterize a maximum allowable loss level. In one embodiment, the loss level 286 characterizes a worst-case loss level.

The link type 288 may characterize a type of the link 195. The link type 288 may specify an IEEE 802 compliant link. Alternatively, the link type 288 may specify one or more of a radio type, a laser type, an electrical cable type, and an optical cable type. In addition, the link type 288 may specify whether the link 195 is encrypted. In one embodiment, the link type 288 specifies one or more demodulation schemes.

The link data rate 290 may specify a data rate for data transmitted over the link 195. In one embodiment, the link data rate 290 is an average data rate. Alternatively, the link data rate 290 is a minimum data rate.

The link priority 292 may specify a priority for communications over the link 195 by a path 190. The link priority 292 may be specified by a provider of the link 195.

Figure 3C:
FIG. 3C is a schematic block diagram illustrating one embodiment of path data.

FIG. 3C is a schematic block diagram illustrating one embodiment of path data 192. The path data 192 may describe a path 190. The path data 192 may be organized as a data structure in a memory. In the depicted embodiment, the path data 192 includes a path identifier 306, a path description 308, a path loss level 316, a path type 310, a path data rate 312, a path priority 314, and one or more link identifiers 282.

The path identifier 306 may uniquely identify the path 190. The path identifier 306 may be an index value. The path description 308 may describe the path 190. For example, the path description 308 may be "path to drone three."

The path loss level 316 may characterize a loss level for data that is communicated over the path 190. The path loss level 316 may characterize an average loss level. Alternatively, the path loss level 316 may characterize a maximum allowable loss level. In one embodiment, the path loss level 316 characterizes a worst-case loss level. The path loss level 316 may be calculated from the loss levels 286 of one or more links 195 that comprise the path 190.

The path priority 314 may specify a priority for communications over the path 190. The path priority 314 may be calculated from link priorities 292 of links 195 that comprise the path 190.

The link identifiers 282 may specify one or more links 195 that comprise the path 190. In one embodiment, the link identifiers 282 specify two or more parallel links 195. Only one link of the two or more parallel links 195 may be employed. Alternatively, two or more of the two or more parallel links 195 may be concurrently employed.

Figure 3D:
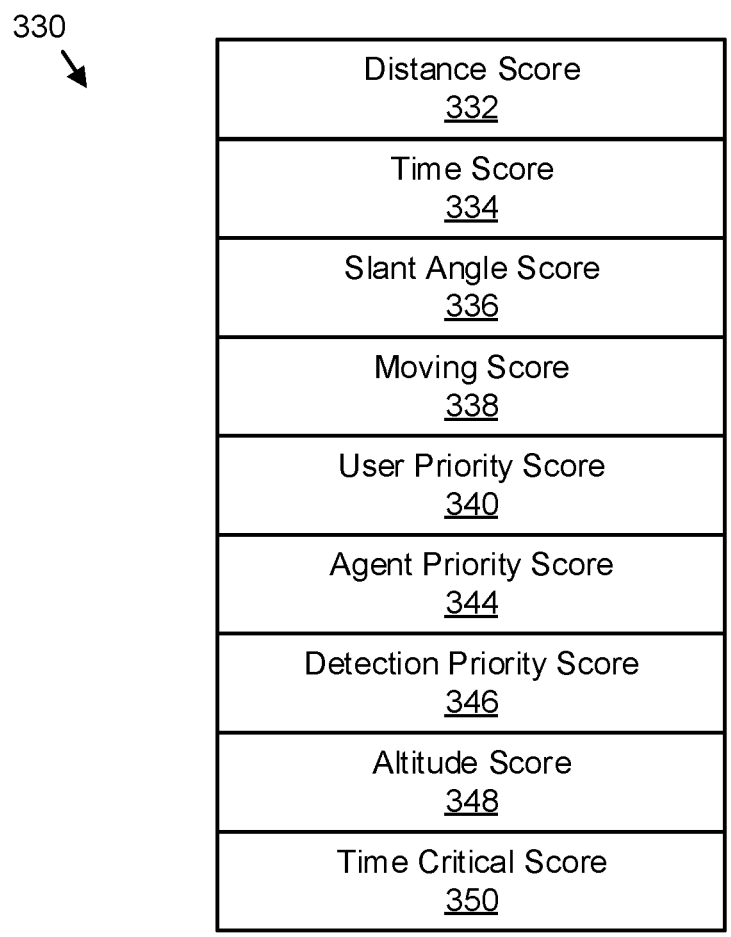
FIG. 3D is a schematic block diagram illustrating one embodiment of score data.

FIG. 3D is a schematic block diagram illustrating one embodiment of score data 330. The score data 330 maybe organized as a data structure in a memory. In the depicted embodiment, the score data 330 includes a distance score 332, a time score 334, a slant angle score 336, a moving score 338, a user priority score 340, an agent priority score 344, a detection priority score 346, a score altitude score 348, and a time critical score 350. The score data 330 may be used to generate a sensor tasks 140 as will be described hereafter.

The distance score 332 may be a function of a distance between a detection in platform data 220 and a sensor platform 105. In one embodiment, the distance score 332 increases as the distance shortens between the detection and the sensor platform 105. The time score 334 may be a function of a time since the detection was measured. In one embodiment, detections with the most recent timestamp 238 have higher time scores 334.

The slant angle score 336 may be a function of a slant range angle from the sensor platform 105 to the detection. The slant angle score 336 may increase as the slant range angle decreases. The moving score 338 may be a function of movement of the detection. The moving score 338 may increase with movement of the detection.

The user priority score 340 may be assigned by a user and/or administrator. The agent priority score 344 may be calculated by a data agent 135. The agent priority score 344 may be an algorithmic score. The detection priority score 346 may be a function of an agent priority score 334 and a user priority score 340.

The altitude score 348 may be a function of the detection's above ground level. The altitude score 348 increases with the distance of a detection above the ground. The time critical score 350 may be set if information regarding the detection is time critical.

Figure 4:
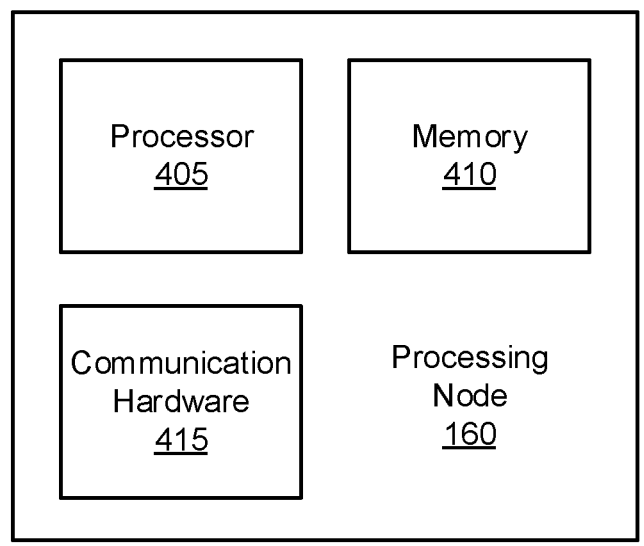
FIG. 4 is a schematic block diagram illustrating one embodiment of a processing node.

FIG. 4 is a schematic block diagram illustrating one embodiment of a processing node 160. One or more processing nodes 160 may be embodied in each sensor platform 105 and management platform 110. In the depicted embodiment, the processing node 160 includes a processor 405, a memory 410, and communication hardware 415. The memory 410 may be a computer readable storage medium such as a semiconductor storage device, a hard disk drive, a holographic storage device, a micromechanical storage device, or the like. The memory 410 may store computer readable program code. The processor 405 may execute the computer readable program code. The communication hardware 415 may communicate with other devices.

Figure 5A:
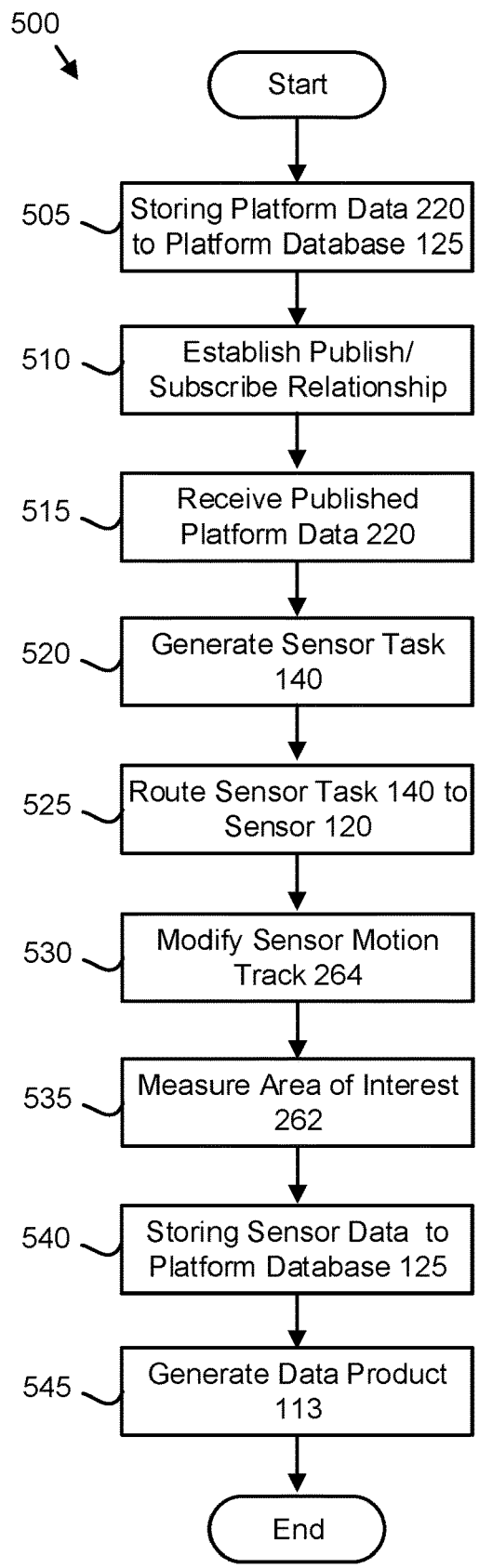
FIG. 5A is a schematic flowchart diagram illustrating one embodiment of an area of interest measurement method.

FIG. 5A is a schematic flowchart diagram illustrating one embodiment of an area of interest measurement method 500. The method 500 may automatically direct a sensor platform 105 and/or sensor 120 to measure an area of interest 262. The method 500 may be performed by one or more processors 405 of one or more processing nodes 160 in the system 100.

The method 500 starts, and in one embodiment, the processor 405 stores 505 platform data 220 to the platform database 125. The platform data 220 may be received from a sensor 120 through an internal bus of a sensor platform 105 or a management platform 110. Alternatively, the platform data 220 may be received from a second platform database 125 of another sensor platform 105 and/or management platform 110. The platform data 220 may be received over a path 190.

The processor 405 may establish 510 a publish/subscribe relationship for platform data 220. The publish/subscribe relationship may be generated by the data publisher 130. In addition, the publish/subscribe relationship may be maintained by the data publisher 130. The publish/subscribe relationship may request specific platform data 220 from the platform database 125 as the platform data 220 becomes available.

The processor 405 may receive 515 published platform data 220. In one embodiment, one or more data agents 135 executing on the processor 405 receive 515 the published platform data 220 from the data publisher 130.

The processor 405 may generate 520 a sensor task 140. The sensor task 140 may include a sensor type 234 and an area of interest 262. In one embodiment, the sensor task 140 is generated as a function of the area of interest 262 and sensor availability 236 of a sensor 120.

In one embodiment, the sensor task 140 is generated 520 for a sensor 120 with a sensor availability 236 that satisfies an availability threshold. In one embodiment, the availability threshold is satisfied if the sensor availability 236 indicates that the sensor 120 is available within the time of interest 274. In addition, the availability threshold may be satisfied if the sensor availability 236 indicates that the sensor 120 may measure the area of interest 262 when the motion track 318 is within the threshold distance of the area of interest 262. Additional embodiments of the generation 520 of the sensor task 140 are described in more detail in FIGS. 5C-D.

The processor 405 may route 525 the sensor task 140 to a sensor 120 of the sensor type 234 and with a sensor motion track 264 that comprises the area of interest 262. Alternatively, the processor 405 may route 525 the sensor task 140 to a sensor 120 of the sensor type 234 regardless of a current sensor motion track 264. In a certain embodiment, the sensor task 140 is routed 525 to the sensor 120 specified by the node identifier 206

In one embodiment, the processor 405 modifies 530 the sensor motion track 264 for the sensor 120. The sensor motion track 264 may be modified 530 to conform to the motion track 318 for the sensor platform 105 that hosts the sensor 120.

In a certain embodiment, the processor 405 modifies 530 the sensor motion track 264 by modifying the motion track 318 for the sensor platform 105 that hosts the sensor 120 to include the area of interest 262. The motion track 318 may be modified 530 to pass within the threshold distance of the area of interest 262.

In a certain embodiment, the motion track 318 is a flight plan. In addition, modifying 530 the sensor motion track 264 may include generating a voice command 266 and/or the text command 268 and issuing movement directions using the voice command 266 and/or the text command 268 to an observer and/or pilot.

The sensor 120 may measure 535 the area of interest 262. The sensor 120 may measure 535 the area of interest 262 as directed by the sensor command 270. In a certain embodiment, the sensor manager 180 communicates the sensor command 272 the sensor 120 and/or the sensor platform 105 and the sensor 120 and/or sensor platform 105 executes the sensor command 272. Alternatively, the sensor manager 180 may directly execute the sensor command 270 by controlling the sensor 120 and/or the sensor platform 105.

The processor 405 may store 540 the sensor data from the measurement two 535 of the area of interest 262 to the platform database 125. The processor 405 may further generate 545 the data product 113 and the method 500 ends. In one embodiment, the processor 405 generates the image 304 from platform data 220. The image 304 may include the sensor data and other platform data 220 identified by the sensor tasks 140 and the target detections 170 used by the agent manager 185 in generating the sensor task 140.

Figure 5B:
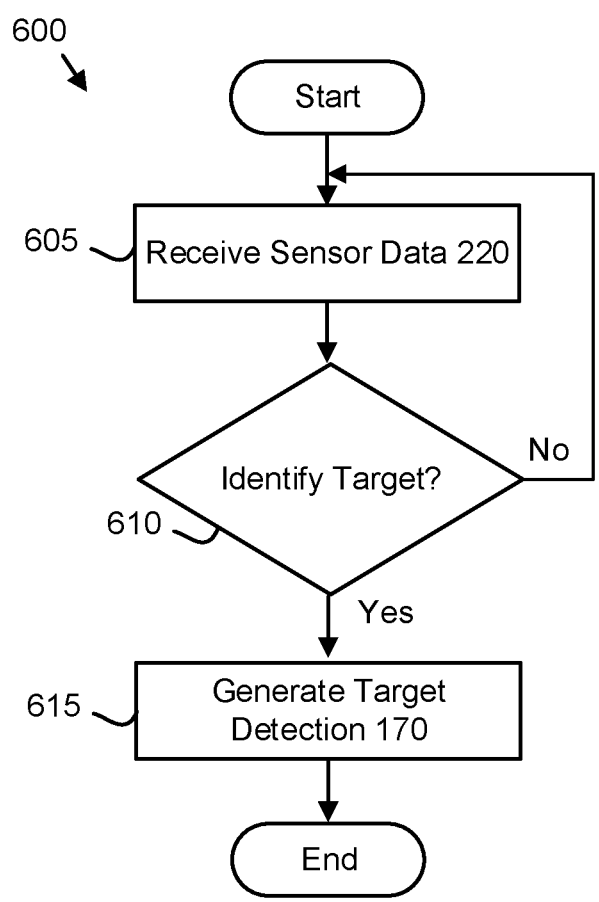
FIG. 5B is a schematic flow chart diagram illustrating one embodiment of a target detection generation method.

FIG. 5B is a schematic flow chart diagram illustrating one embodiment of a target detection generation method 600. The method 600 may automatically generate a target detection 170. The method 600 may be performed by one or more processors 405 of one or more processing nodes 160 in the system 100. In particular, the one or more processors 405 may host the data agents 135 and/or the agent manager 185.

The method 600 starts, and in one embodiment, the processor 405 receives 605 the platform data 220. The platform data 220 may be received in response to a publish/subscribe relationship being satisfied.

The processor 405 may determine 610 if a target is identified. In one embodiment, the target is identified if the target characteristics 250 are satisfied by the platform data 220. If the target is not identified, the processor 405 may continue to receive 605 platform data 220.

In one embodiment, a first data agent 135 may identify a detection 356 from the platform data 220. For example, the first data agent 135 may identify a metal signature from radar platform data 220 as a detection 356. A second data agent may analyze image platform data 220 to determine 610 if the detection 356 is a target. The detection 356 may be identified as a target if the detection 236 satisfies an algorithm such as a vehicle identification algorithm from the target characteristics 250.

If the target is identified, the processor 405 may generate 615 the target detection 170 and the method 600 ends. In one embodiment, the processor 405 generates the target geometry 244 from the platform data 220. In addition, the processor 405 may generate a target location 246 from the platform data 220. In one embodiment, the target type 248 is retrieved from the target characteristics 250.

Figure 5C:
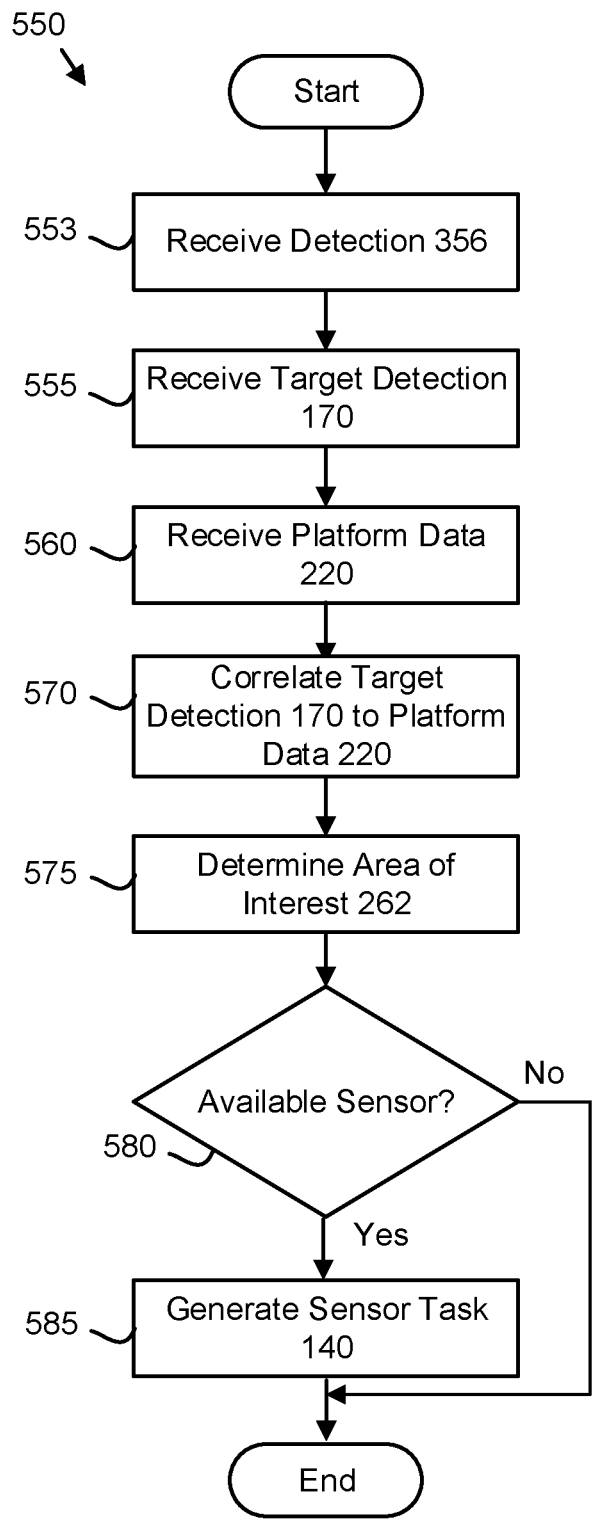
FIG. 5C is a schematic flow chart diagram illustrating one embodiment of a sensor task generation method.

FIG. 5C is a schematic flow chart diagram illustrating one embodiment of a sensor task generation method 550. The method 550 may generate a sensor task 140, such as for step 520 of FIG. 5A. The method 550 may be performed by one or more processors 2405 of one or more processing nodes 160 in the system 100.

The method 550 starts, and in one embodiment, the processor 405 receives 553 a detection 356. The detection 356 may be generated by a data agent 135 in response to platform data 220 satisfying target characteristics 250 and/or one or more detection algorithms.

In one embodiment, the processor 405 receives 555 the target detection 170. The target detection 170 may be received 555 by one or more data agents 135 executed by the processor 405. The processor 405 further receives 560 platform data 220. The platform data 220 may be received from the data publisher 130 in response to a publish/subscribe relationship being satisfied.

In one embodiment, the publish/subscribe relationship may be established for the detection 356 and/or target detection 170 for the platform data 220. The publish/subscribe relationship may request all platform data 220 with measurement coordinates that are located at the detection 356 and/or target detection 170.

The processor 405 may correlate 570 the detection 356 and/or target detection 170 to the platform data 220. The target location 246 of the target detection 170 may be matched to the measurement coordinates 224 of the platform data 220. Alternatively, the measurement coordinates 224 corresponding to the detection 356 may be matched to the measurement coordinates 224 of the platform data 220. In one embodiment, the processor 405 matches a target geometry 244 of the target detection 170 to one or more geographic features from the sensor measurement 228 of the platform data 220. In addition, the processor 405 may match sensor measurements 228 corresponding to the detection 356 to one or more geographic features from the sensor measurement 228 of the platform data 220.

The processor 405 may determine 575 the area of interest 262 to be located at the measurement coordinates 224 for the sensor measurements 228 that correlate to the target geometry 244. In addition, the area of interest 262 may be determined 575 to have an area of interest radius from the measurement coordinates 224 for the sensor measurements 228 that correlate to the target geometry 244. In one embodiment, the area of interest radius is determined as a function of the target type 248. For example, if the target type 248 is a vehicle target type, the area of interest radius may be determined as a function of possible travel by the vehicle. Alternatively, if the target type 248 is a building target type, the area of interest radius may be calculated as a function of the measurement error 226.

The processor 405 may determine 580 if a sensor 120 is available to measure the area of interest 262. In one embodiment, a sensor 120 is available if the sensor platform 105 hosting the sensor 120 has a motion track 318 within the threshold distance of the area of interest 262. In an alternative embodiment, the sensor 120 is available if the motion track 318 for sensor platform 105 hosting the sensor 120 is within the threshold distance of the area of interest 262 during the time of interest 274. In a certain embodiment, the sensor 120 is available if the sensor availability 236 indicates the sensor 120 is available during the time of interest 274. If no sensor 120 is available, the method 550 ends.

If the sensor 120 is available, the processor 405 may generate 585 the sensor task 140 for the target detection 170 and the method 550 ends. In one embodiment, the sensor task 140 is generated 585 for a sensor 120 disposed on a sensor platform 105 with a motion track 318 that is within a threshold distance of the area of interest 262. In addition, the sensor task 140 may be generated 585 for a sensor 120 of a specified sensor type 234.

The processor 405 may generate 585 a sensor task 140 with a sensor motion track 264 that includes the area of interest 262. The sensor motion track 264 may be generated 585 to conform to the motion track 318 of the sensor platform 105 hosting the sensor 120. The processor 405 may further generate 585 the sensor task 140 with the sensor identifier 272 for the sensor 120, the node identifier 206 for the sensor platform 105, the time of interest 274, the voice command 266, the text command 268, and the sensor command 270.

Figure 5D:
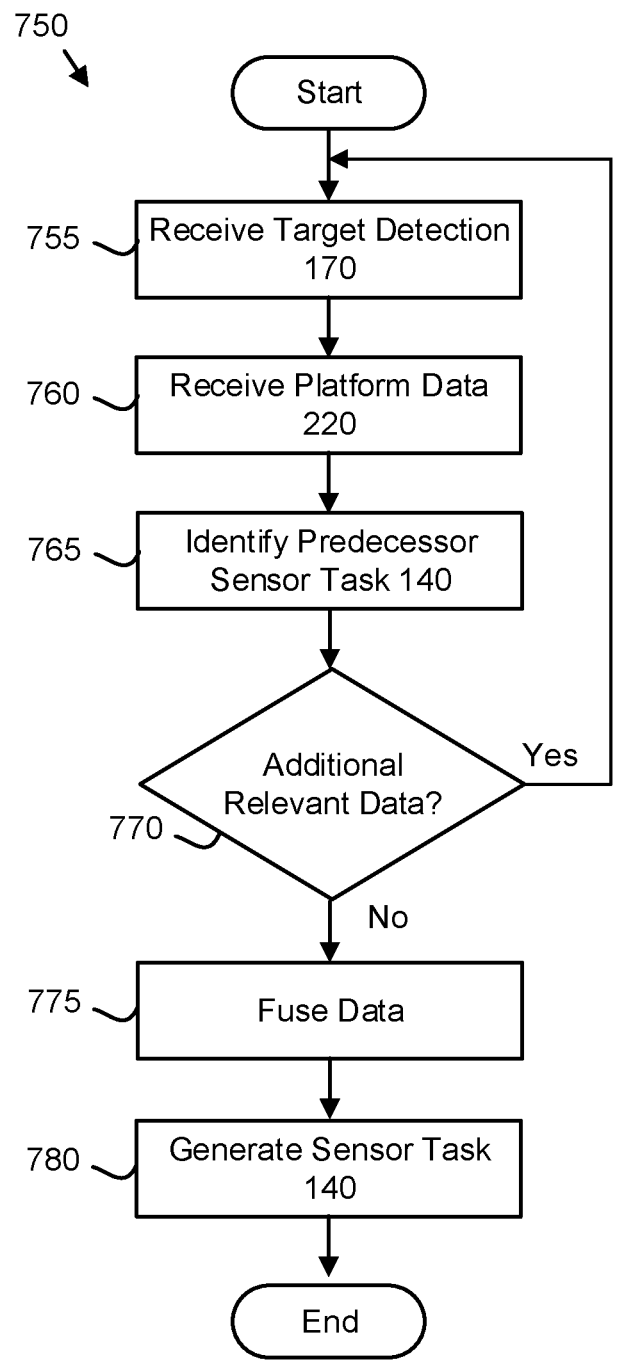
FIG. 5D is a schematic flow chart diagram illustrating one alternate embodiment of a sensor task generation method.

FIG. 5D is a schematic flow chart diagram illustrating one alternate embodiment of a sensor task generation method 750. The method 750 may fuse data from one or more of platform data 220, target detections 170, and/or sensor tasks 140 to generate a sensor task 140. The method 750 may be performed by one or more processors 405 of one or more processing nodes 160 in the system 100. In particular, the one or more processors 405 may host the data agents 135 and/or the agent manager 185.

The method 750 starts, and in one embodiment, the processor 405 receives 755 a target detection 170 and/or detection 356. A data agent 135 may receive 755 the target detection 170 and/or detection 356 in response to generation of the target detection 170 and/or detection 356. Alternatively, an administrator may activate the target detection 170 for processing by the data agent 135.

The processor 405 may further receive 760 platform data 220. In one embodiment, the data agent 135 requests a publish/subscribe relationship for platform data 220 related to the target detection 170. The data publisher 130 may generate the publish/subscribe relationship and receive the desired platform data 220 from the platform database 125. Measurement coordinates 224 of the platform data 220 may be requested that match the target location 246. Alternatively, the measurement coordinates 224 corresponding to the detection 356 may be requested.

The processor 405 further identifies 765 a predecessor sensor task 140. The predecessor sensor task 140 may have been responsible for the generation of the target detection 170, the detection 356, and/or the platform data 220. Alternatively, the predecessor sensor task 140 may have processed platform data 220 corresponding to the target location 246.

The processor 405 may further determine 770 if there is additional relevant data. In one embodiment, the data agent 135 examines the received detections 356, target detections 170, received platform data 220, and identified predecessor sensor tasks 140 to determine if additional detections 356, target detections 170, platform data 220, and/or predecessor sensor tasks 140 are related to the received detections 356, target detections 170, received platform data 220, and identified predecessor sensor tasks 140. If additional target detections 170, platform data 220, and/or predecessor sensor tasks 140 are relevant, the method 750 loops to receive 755 an additional target detection 170 or detection 356, receive 760 additional platform data 220, and/or identify an additional predecessor sensor task 140.

If no additional target detections 170 and detections 356, platform data 220, and/or predecessor sensor tasks 140 are relevant, the processor fuses 775 data from one or more of the target detections 170 and detections 356, platform data 220, and/or predecessor sensor task 140 as a new sensor task 140. In one embodiment, the data is filtered by removing data outside of the area of interest 262. In addition, one or more of a low-pass filter, a high pass filter, and a bandpass filter may be applied to the data.

The processor 405 may identify target detections 170 within the data. In one embodiment, the processor 405 identifies target detections 170 within the area of interest 262. In a certain embodiment, the processor 405 calculates score data 330 for each target detection 170. In addition, the processor 405 may calculate a target score using the score data 330.

In one embodiment, the processor 405 generates 780 the sensor task 140 and the method 750 ends. The processor 405 may generate 780 one or more sensor tasks 140 for each target detection 170 with the target score that exceeds a target threshold.

Figure 5E:
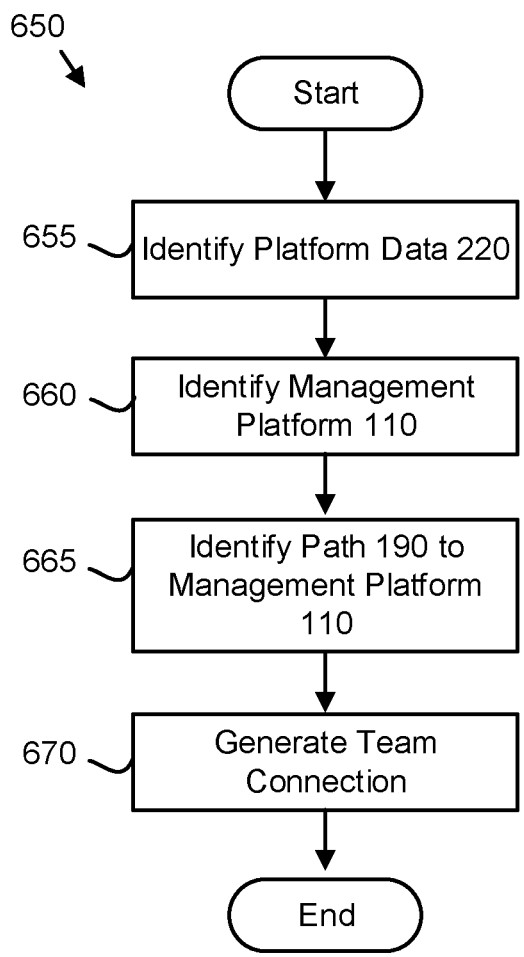
FIG. 5E is a schematic flow chart diagram illustrating one embodiment of a team connection generation method.

FIG. 5E is a schematic flowchart diagram illustrating one embodiment of a team connection generation method 650. The method 650 may generate a team connection 200. The method 650 may be performed by one or more processors 405 of one or more processing nodes 160 in the system 100.

The method 650 starts, and in one embodiment, the processor 405 identifies 655 platform data 220. The platform data 220 may include measurements needed by one or more users and/or administrators. The processor 405 further identifies 660 the management platform 110 of the one or more users and/or administrators and need the platform data 220.

The processor 405 may identify 665 at least one path 190 between the platform data 220 and the management platforms 110. The path 190 may comprise only links 195 that satisfy the IEEE 802 standard as of the filing of this application. In one embodiment, the identified at least one path 190 has a path loss level 316 that meets a loss level threshold. In addition, the identified at least one path 190 may have a path data rate 312 that meets a data rate threshold. In a certain embodiment, the identified at least one path 190 has a path priority 314 that meets a priority threshold.

The processor 405 may generate 670 the team connection 200 between the platform data 220 and the at least one management platform 110 of the one or more users and/or administrators the method 650 ends. In one embodiment, the processor 405 generates 670 the team identifier 202 with the path identifier 306 of the identified path 190. In addition, the processor 405 may record a node identifier 206 for each management platform 110 and each sensor platform 105 and/or management platform hosting the platform data 220. The processor 405 may further record a data index 222 for the platform data 220.

Figure 5F:
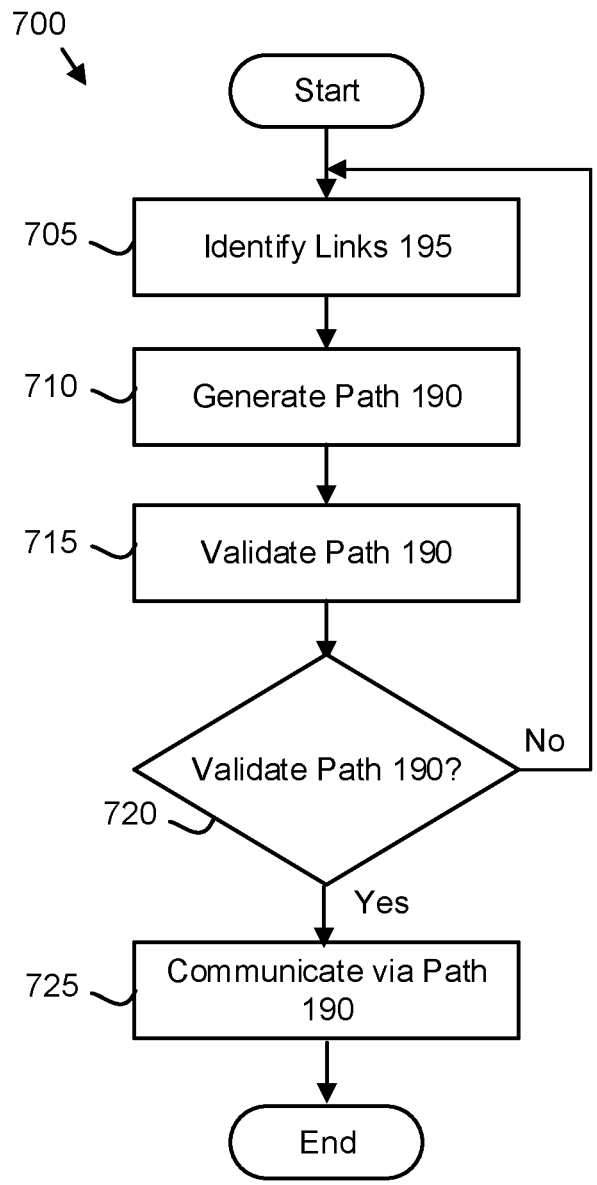
FIG. 5F is a schematic flowchart diagram illustrating one embodiment of a path communication method.

FIG. 5F is a schematic flowchart diagram illustrating one embodiment of a path communication method 700. The method 700 may generate and validate a path 190, and communicate via the path 190.

The method 700 starts, and in one embodiment, the processor 405 identifies 705 at least one link 195 that interconnects one or more of a sensor 120, platform data 220, and a mission manager 155. In one embodiment, the processor 405 identifies 705 links 195 until communications may be sent over a continuous network of the links 195 to each of the sensor 120, the platform data 220, and a mission manager 115.

The processor 405 further generates 710 a path 190 that comprises the identified links 195. In one embodiment, the processor 405 generates 710 the path data 192 of FIG. 3C. The processor 405 may generate 710 the path data 192 from the linked data 280 of each of the identified links 195. The generated path 190 may satisfy a path policy comprising one or more of a loss level threshold, a path type threshold, a path data rate threshold, and a path priority threshold. For example, the generated path 190 may satisfy the path policy if one or more of the path loss level 316 meets the loss level threshold, the path type 310 meets the path type threshold, the path data rate 312 meets the path data rate threshold, and the path priority 314 meets the path priority threshold.

The processor 405 may further validate 715 the path 190. In one embodiment, the processor validates 715 the path 190 by communicating a message over the path 190.

The processor 405 may determine 720 if the path 190 is validated. The path 190 may be validated if the path 190 is IEEE 802 compliant. In addition, the path 190 may be validated if the message is communicated over the path 190.

The path 190 may be validated if the loss level for the message meets the path loss level 316. The path 190 may further be validated if the data rate for the message meets the path data rate 312. If the selected path 190 is not validated, the processor 405 may identify 705 one or more alternate links 195 and generate 710 another path 190. If the path 190 is validated, the processor 405 may communicate 725 via the path 190 and the method 700 ends.

Figure 6A:
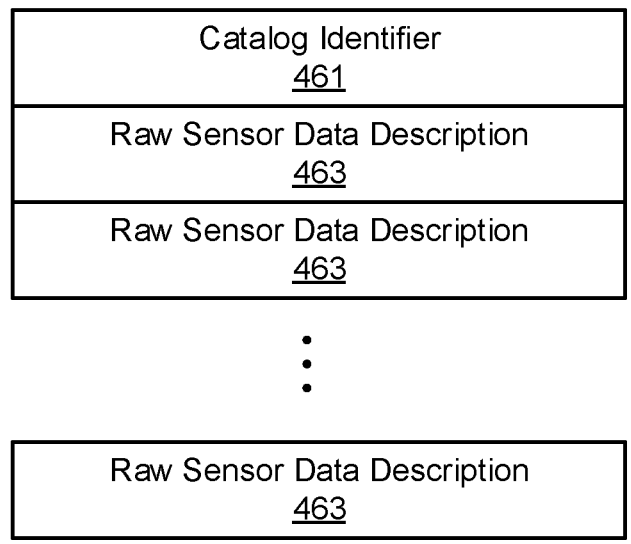
FIG. 6A is a schematic block diagram illustrating one embodiment of a catalog.

FIG. 6A is a schematic block diagram illustrating one embodiment of a catalog 460. The catalog 460 may be organized as a data structure in a memory 410. In the depicted embodiment, the catalog 460 includes a catalog identifier 461 and one or more raw sensor data descriptions 463. The catalog identifier 461 may uniquely identify the catalog 460. The raw sensor data descriptions 463 may each describe sensor data in the platform database 125 of at least one sensor platform 105 and/or management platform 110. The raw sensor data descriptions 463 are described in more detail in FIG. 6B

Figure 6B:
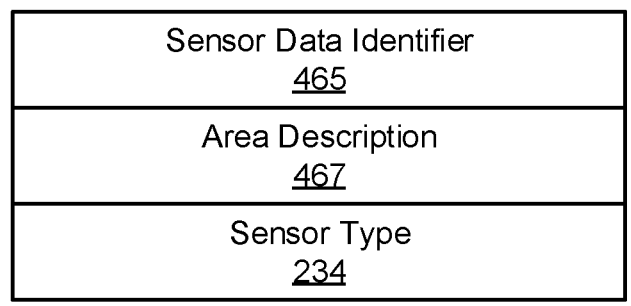
FIG. 6B is a schematic block diagram illustrating one embodiment of a raw sensor data description.

FIG. 6B is a schematic block diagram illustrating one embodiment of the raw sensor data description 463. In the depicted embodiment, the raw sensor data description 463 includes a sensor data identifier 465, an area description 467, and a sensor type 234. The sensor data identifier 465 identifies sensor data. The area description 465 may describe an area covered by the sensor data. In one embodiment, the area description 467 includes a plurality of areas and each area includes a timestamp. The sensor type 234 describes the type of sensor 120 that recorded the sensor data.

FIG. 6C is a schematic block diagram illustrating one embodiment of a dynamic target area 470. The dynamic target area 470 may be organized as a data structure in a memory 410. In the depicted embodiment, the dynamic target area 470 includes one or more temporal/spatial vectors 471, a target model 473, a confidence level 475, and a search time 477. The temporal/spatial vectors 471 are described in more detail in FIG. 6D.

The target model 473 may be based on a target type 248 and/or target characteristics 250. The target model 473 may forecast movements of a target detection 170. The confidence level 475 may specify a desired confidence level for finding the target detection 170 within the dynamic target area 470. In one embodiment, the search time 477 specifies a historical time for the dynamic target area 470 up to the present.

Figure 6D:
FIG. 6D is a schematic block diagram illustrating one embodiment of a temporal/spatial vector.
Figure 6D:
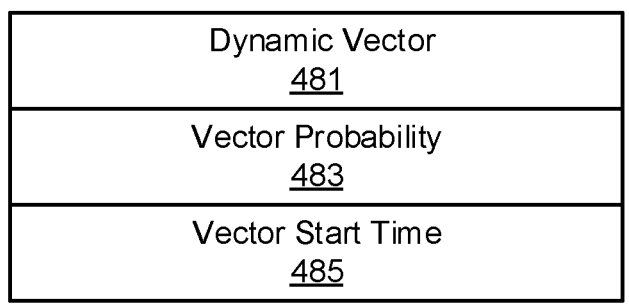
Figure 6D:
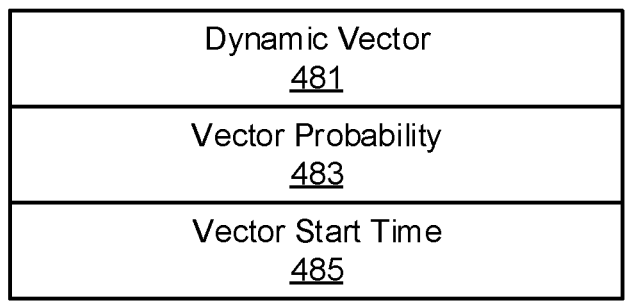

FIG. 6D is a schematic block diagram illustrating one embodiment of the temporal/spatial vector 471. In the depicted embodiment, the temporal/spatial vector 471 includes a dynamic vector 481, a vector probability 483, and a vector start time 485. In a certain embodiment, the temporal/spatial vector 471 includes a plurality of vector sets wherein each vector set includes a dynamic vector 481, a vector probability 483, and a vector start time 485.

The dynamic vector 481 may describe a start spatial coordinate at the vector start time 485 and projected spatial coordinates before and after the vector start time 485. In one embodiment, each temporal/spatial vector 471 is a dynamic temporal/spatial vector 471 that changes as a function of the search time 477 and/or confidence level 475. As a result, the dynamic target area 470 also changes as a function of the search time 477 and/or the confidence level 475. For example, the temporal/spatial vector 471 may lengthen for later search times 477 and/or higher confidence levels 475.

Figure 6E:
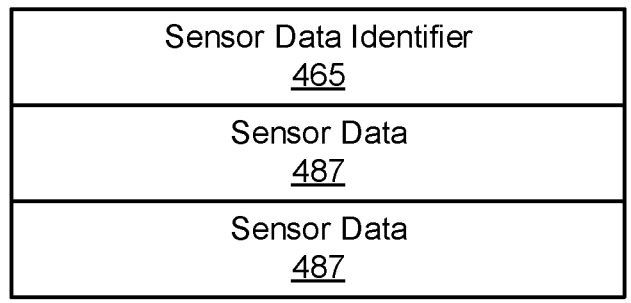
FIG. 6E is a schematic block diagram illustrating one embodiment of sensor data.

FIG. 6E is a schematic block diagram illustrating one embodiment of the sensor data 487. The sensor data 487 maybe organized as a data structure in a memory 410. The sensor data identifier 465 may identify the sensor data 487. In one embodiment, the sensor data 487 is raw sensor data 487 as received directly from a sensor 120. Alternatively, the sensor data 487 may be filtered and/or preprocessed sensor data 487.

Figure 7A:
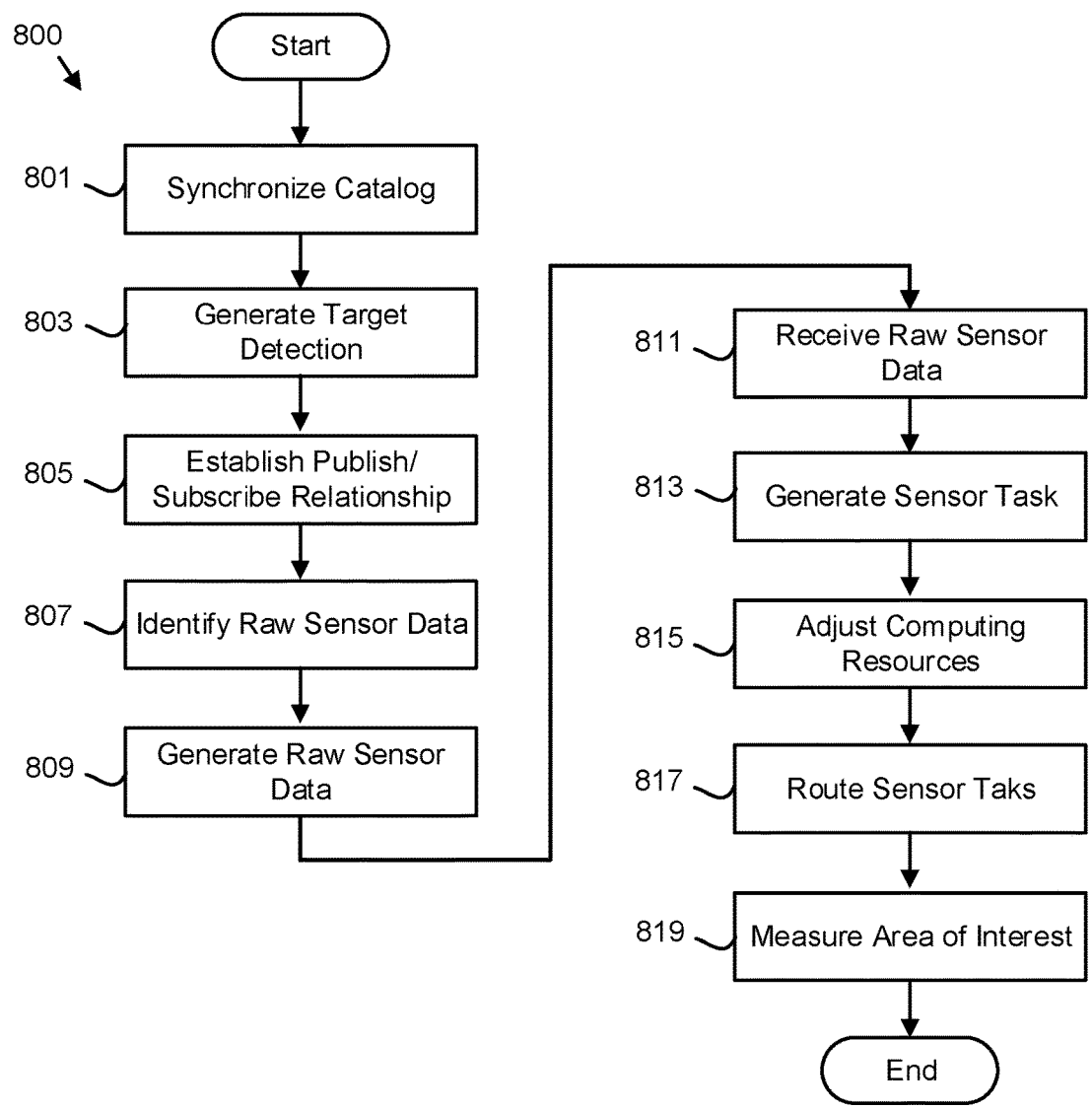
FIG. 7A is a schematic flow chart diagram illustrating one embodiment of an area of interest measurement method.

FIG. 7A is a schematic flow chart diagram illustrating one embodiment of an area of interest measurement method 800. The method 800 measures an area of interest 262 based on a sensor task 140. The method 800 may be performed by one or more processors 405 of one or more processing nodes 160 in the system 100.

The method 800 starts, and in one embodiment, the processor 405 synchronizes 801 a catalog 460 of sensor data 487. The processor 405 may synchronize 801 the catalog 460 to a first sensor platform 105 from a second sensor platform 105. The catalog 460 may identify raw sensor data 487. In addition, the catalog 460 may be organized to be searched by area description 467 and sensor type 234.

The processor 405 may generate 803 a target detection 170. The target detection may be generated 803 at the first sensor platform 105 in response to first sensor platform data satisfying the detection algorithm.

The processor 405 may establish 805 a publish/subscribe relationship for a dynamic target area 470 bounded by dynamic temporal/spatial vectors 471. The publish/subscribe relationship may be established 805 with the catalog 460. In one embodiment, the dynamic target area 470 is continuously updated based on the target model 473. In addition, the dynamic target area 470 may be continuously updated based on the confidence level 475. In one embodiment, the dynamic target area 470 is continuously updated based on the search time 477.

The processor 405 may identify 807 from the catalog 460 the raw sensor data 487 that satisfies the publish/subscribe relationship. In one embodiment, the processor 405 calculates the dynamic target area 470 as bounded by temporal/spatial vectors 471 for one or more of a given target model 473, a given confidence level 475, and a given search time 477. The processor 405 may further determine if an area description 465 is within the dynamic target area 470. If the area description 465 is within the dynamic target area 470, the raw sensor data description 463 and corresponding sensor data 487 identified by the sensor data identifier 465 satisfies the publish/subscribe relationship.

The processor 405 may generate 809 the raw sensor data 487 that satisfies the publish/subscribe relationship. In one embodiment, the raw sensor data 487 is generated 809 at the second sensor platform 105. The raw sensor data 487 may be transmitted from the second sensor platform 105 to the first sensor platform 105. The processor 405 may receive 811 the raw sensor data 487 in response to the publish/subscribe relationship. The raw sensor data 487 may be received 811 at the first sensor platform 105.

The processor 405 may generate 813 a sensor task 140 comprising a sensor type 234 and an area of interest 262 from the target detection 170 and/or the raw sensor data 487. In one embodiment, the processor 405 generates 813 the sensor task 140 as described in step 520 of FIG. 5A.

In one embodiment, the processor 405 adjusts 815 computing resources, such as the number of computers 400 and/or processor 405 for the sensor task 140, based on the sensor task 140. The computing resources may be adjusted 815 based on the expected quantity of sensor data 487.

The processor 405 may route 817 the sensor task 140 to a sensor 120 of the sensor type 234. In one embodiment, the sensor 120 has a sensor motion track 264 that comprises the area of interest 262. The sensor task 140 may be routed 815 as described in step 525 of FIG. 5A. The processor 405 may further measure 819 the area of interest 262 with the sensor 120 based on the sensor task 140 and the method 800 ends.

In one embodiment, the area of interest 262 is measured 819 based on a priority for the area of interest 262 and/or a target associated with the area of interest 262 based on the score data 330. For example, the area of interest 262 with a highest priority based on the score data 330 may be measured 819 first.

Figure 7B:
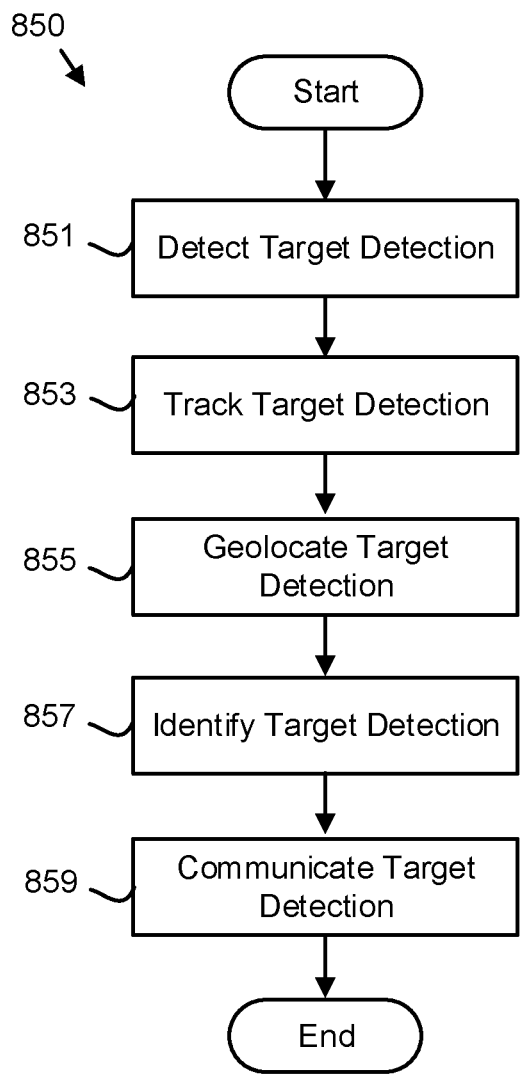
FIG. 7B is a schematic flow chart diagram illustrating one embodiment of the target detection management method.

FIG. 7B is a schematic flow chart diagram illustrating one embodiment of the target detection management method 850. The method 850 may manage target detections 170. The method 850 may be performed by one or more processors 405 of one or more processing nodes 160 in the system 100.

The method 850 starts, and in one embodiment, the processor 405 detects 851 a target detection 170. The target detection 170 may be detected 851 as described in FIG. 5B.

The processor 405 further tracks 853 the target detection 170. In one embodiment, the target detection 170 is tracked 853 based on the user priority score 340 and/or the agent priority score 344. In a certain embodiment, the target detection 170 is tracked 853 based on score data 330 for the area of interest 262.

The processor 405 may geolocate 855 the target detection 170. The target detection 170 may be geolocated 855 at the target location 246. In addition, the processor 405 may identify 857 the target detection 170. The target detection 170 may be identified 857 based on one or more of the target geometry 244, the target location 246, the target type 248, and/or the target characteristics 250. In one embodiment, the processor 405 communicates 859 the target detection 170 and the method 850 ends. In a certain embodiment, the target detection 170 is communicated 859 to a management platform 110.

The embodiments automatically generate the sensor task 140 with a sensor type 234 and area of interest 262. The sensor task 140 may be generated using the data agents 135 acting autonomously and/or under user control. The sensor task 140 may be automatically routed to a sensor 120 of the sensor type 234 and with a sensor motion track 264 that comprises the area of interest. The embodiments further automatically measure the area of interest 262 with the sensor 120 based on the sensor task 140. As a result, the measurement of the area of interest 262 and related data processing activities are greatly improved.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    synchronizing, at a first sensor platform, by use of a processor, a catalog of sensor data from a second sensor platform, wherein the catalog identifies raw sensor data, the sensor data comprises an area description and a sensor type, and the catalog is organized to be searched by the area description and the sensor type;
    generating, at the first sensor platform, a target detection in response to first platform sensor data satisfying a detection algorithm;
    establishing, at the first sensor platform, a publish/subscribe relationship for a dynamic target area bounded by dynamic temporal/spatial vectors for the target detection, wherein the dynamic temporal/spatial vectors each comprise a dynamic vector, a vector probability and a vector start time, and the dynamic target area is continuously updated based on a target model based on a desired confidence level for finding the target detection within the dynamic target area;
    identifying, from the catalog, the raw sensor data that satisfies the publish/subscribe relationship;
    generating, at the second sensor platform, the raw sensor data in response to the publish/subscribe relationship;
    receiving, at the first sensor platform, the raw sensor data in response to the publish/subscribe relationship;
    generating, at the first sensor platform, a sensor task comprising a sensor type and an area of interest from the target detection and the raw sensor data, wherein the area of interest is organized as spatial coordinates;
    routing the sensor task to a sensor of the sensor type and with a sensor motion track that comprises the area of interest; and
    measuring the area of interest with the sensor based on the sensor task.

2. The method of claim 1, wherein the area of interest is measured based on a priority calculated based on a distance score, a time score, a slant angle score, a moving score, a user priority score, an agent priority score, a detection priority score, an altitude score, and a time critical score, and the method further comprises adjusts computing resources based on the sensor task.

3. The method of claim 1, the method further comprising:
    detecting the target detection;
    tracking the target detection;
    geolocating the target detection;

identifying the target detection; and
communicating the target detection.

4. The method of claim 1, wherein generating the sensor task comprises:
correlating the target detection to the platform data;
determining the area of interest;
determining if the sensor of the sensor type is available for the area of interest; and
generating the sensor task as a function of the area of interest and sensor availability.

5. The method of claim 1, the method further fusing at least two of a predecessor sensor task and the target detection as the sensor task.

6. The method of claim 1, wherein a data agent generates the sensor task.

7. The method of claim 1, the method further generating a data product comprising one or more of platform data, at least one sensor task, and at least one target detection.

8. The method of claim 1, the method further comprising modifying a sensor motion track for the sensor.

9. The method of claim 8, wherein modifying the sensor motion track comprises modifying a motion track of a sensor platform.

10. The method of claim 8, wherein modifying the sensor motion track comprises issuing movement directions to an observer.

11. The method of claim 1, wherein sensor task comprises the sensor, the sensor type, the area of interest, and the sensor motion track.

12. The method of claim 1, the method further comprising:
identifying platform data;
identifying at least one management platform;
identifying at least one path between the platform data and the at least one management platform; and
generating a team connection for the platform data.

13. The method of claim 12, wherein the team connection comprises a data index for the platform data, a node identifier for each of the at least one management platform, and a path identifier for a path to each of the at least one management platform.

14. The method of claim 1, the method further comprising
identifying a link interconnecting one or more of the sensor, the first platform data, and a mission manager;
generating a path comprising the identified links;
validating the path; and
communicating via the path.

15. The method of claim 14, wherein the generated path satisfies a path policy comprising one or more of a loss level threshold, a path type threshold, a path data rate threshold, and a path priority threshold.

16. An apparatus comprising:
a processor;
a memory storing code executable by the processor to:
synchronize, at a first sensor platform, a catalog of sensor data from a second sensor platform, wherein the catalog identifies raw sensor data, the sensor data comprises an area description and a sensor type, and the catalog is organized to be searched by the area description and the sensor type;
generate, at the first sensor platform, a target detection in response to first platform sensor data satisfying a detection algorithm;
establish, at the first sensor platform, a publish/subscribe relationship for a dynamic target area bounded by dynamic temporal/spatial vectors for the target detection, wherein the dynamic temporal/spatial vectors each comprise a dynamic vector, a vector probability, and a vector start time, and the dynamic target area is continuously updated based on a target model based on a desired confidence level for finding the target detection within the dynamic target area;
identify, from the catalog, the raw sensor data that satisfies the publish/subscribe relationship;
generate, at the second sensor platform, the raw sensor data in response to the publish/subscribe relationship;
receive, at the first sensor platform, the raw sensor data in response to the publish/subscribe relationship;
generate, at the first sensor platform, a sensor task comprising a sensor type and an area of interest from the target detection and the raw sensor data, wherein the area of interest is organized as spatial coordinates;
route the sensor task to a sensor of the sensor type and with a sensor motion track that comprises the area of interest; and
measure the area of interest with the sensor based on the sensor task.

17. The apparatus of claim 16, wherein the area of interest is measured based on a priority calculated based on a distance score, a time score, a slant angle score, a moving sore, a user priority score, an agent priority score, a detection priority score, an altitude score, and a time critical score, and the processor further adjusts computing resources based on the sensor task.

18. The apparatus of claim 16, wherein the processor further performs:
detecting the target detection;
tracking the target detection;
geolocating the target detection;
identifying the target detection; and
communicating the target detection.

19. A system comprising:
a sensor platform comprising:
one or more sensors;
a processor;
a memory storing code executable by the processor to:
synchronize, at a first sensor platform, a catalog of sensor data from a second sensor platform, wherein the catalog identifies raw sensor data, the sensor data comprises an area description and a sensor type, and the catalog is organized to be searched by the area description and the sensor type;
generate, at the first sensor platform, a target detection in response to first platform sensor data satisfying a detection algorithm;
establish, at the first sensor platform, a publish/subscribe relationship for a dynamic target area bounded by dynamic temporal/spatial vectors for the target detection, wherein the dynamic temporal/spatial vectors each comprise a dynamic vector, a vector probability, and a vector start time, and the dynamic target area is continuously updated based on a target model based on a desired confidence level for finding the target detection within the dynamic target area;
identify, from the catalog, the raw sensor data that satisfies the publish/subscribe relationship;
generate, at the second sensor platform, the raw sensor data in response to the publish/subscribe relationship;
receive, at the first sensor platform, the raw sensor data in response to the publish/subscribe relationship;
generate, at the first sensor platform, a sensor task comprising a sensor type and an area of interest from the target detection and the raw sensor data, wherein the area of interest is organized as spatial coordinates;

route the sensor task to a sensor of the sensor type and with a sensor motion track that comprises the area of interest; and measure the area of interest with the sensor based on the sensor task.

20. The system of claim 19, wherein the area of interest is measured based on a priority calculated based on a distance score, a time score, a slant angle score, a moving score, a user priority score, an agent priority score, a detection priority score, an altitude score, and a time critical score, and the processor further adjusts computing resources based on the sensor task.

* * * * *